US00RE41229E

(19) United States
(12) Reissued Patent
Swinford

(10) Patent Number: US RE41,229 E
(45) Date of Reissued Patent: Apr. 20, 2010

(54) METHODS AND APPARATUS FOR REGULATING GAS TURBINE ENGINE FLUID FLOW

(75) Inventor: Mark Douglas Swinford, Centerville, OH (US)

(73) Assignee: General Electric Company, Schenectady, NY (US)

(21) Appl. No.: 11/505,218

(22) Filed: Aug. 16, 2006

Related U.S. Patent Documents

Reissue of:
(64) Patent No.: 6,775,990
Issued: Aug. 17, 2004
Appl. No.: 10/272,799
Filed: Oct. 17, 2002

(51) Int. Cl.
*F02C 6/08* (2006.01)

(52) U.S. Cl. ..... 60/785; 251/62; 251/305
(58) Field of Classification Search ..... 60/785; 251/58, 62, 63.5–63.6, 228, 298–301, 304–307; 454/30, 264–267, 333, 347, 358, 363
See application file for complete search history.

(56) References Cited

U.S. PATENT DOCUMENTS 868,182 A * 10/1907 Hayden ..... 251/288
1,397,739 A * 11/1921 Moyer ..... 454/259
3,107,892 A * 10/1963 Ellis ..... 251/31
3,108,767 A * 10/1963 Ellis et al. ..... 244/203
3,545,486 A * 12/1970 Larson ..... 137/554
3,912,223 A * 10/1975 Iwata ..... 251/299
4,248,051 A * 2/1981 Darcy et al. ..... 62/115
4,576,358 A * 3/1986 Mott et al. ..... 251/14
4,691,689 A * 9/1987 Shepherd et al. ..... 126/295
5,063,963 A * 11/1991 Smith ..... 137/606
5,151,022 A * 9/1992 Emerson et al. ..... 423/245.3
5,327,720 A * 7/1994 Tran ..... 60/39.281
5,327,744 A * 7/1994 Frawley et al. ..... 62/401
5,396,760 A * 3/1995 Hines ..... 60/39.511
5,860,283 A * 1/1999 Coleman et al. ..... 62/87
6,327,845 B2 * 12/2001 Ojiro et al. ..... 60/39.23
6,481,210 B1 * 11/2002 Chapman ..... 60/772

* cited by examiner

*Primary Examiner*—Louis J Casaregola
(74) *Attorney, Agent, or Firm*—William Scott Andes, Esq.; Armstrong Teasdale LLP

(57) ABSTRACT

A method enables a gas turbine engine to be operated. The method includes directing fluid flow from a source into an inlet of a valve, channeling the fluid flow entering an inlet portion of the valve towards an outlet portion of the valve such that a direction of the fluid flow is changed within the inlet portion, and controlling the amount of fluid flow entering the outlet portion of the valve by selectively positioning a valve disk coupled within the inlet portion of the valve by a valve disk axle. The method also comprises channeling the fluid flow from the inlet portion of the valve through the outlet portion of the valve and into a fluid supply pipe, wherein the valve outlet portion has a substantially right cylindrical shape such that a direction of fluid entering the body outlet portion remains substantially constant therethrough.

31 Claims, 5 Drawing Sheets

METHODS AND APPARATUS FOR REGULATING GAS TURBINE ENGINE FLUID FLOW

Matter enclosed in heavy brackets [ ] appears in the original patent but forms no part of this reissue specification; matter printed in italics indicates the additions made by reissue.

BACKGROUND OF THE INVENTION

This invention relates generally to gas turbine engines and more particularly, to valve assemblies used to regulate fluid flow for a gas turbine engine.

Gas turbine engines typically include an engine casing that extends circumferentially around a compressor, and a turbine including a rotor assembly and a stator assembly. Within at least some known engines, a plurality of ducting and valves coupled to an exterior surface of the casing are used to channel fluid flow from one area of the engine for use within another area of the engine. For example, such ducting and valves may form a portion of an environmental control system (ECS).

At least some known valve assemblies are used to control fluid flow that is at a high temperature and/or high pressure. Such valve assemblies include a substantially cylindrical valve body that is coupled between adjacent sections of ducting. The valve body includes a valve sealing mechanism that is selectively positionable to control fluid flow through the valve. More specifically, at least some known valves includes a piston/cylinder arrangement that is positioned external to the valve body and is coupled to the valve sealing mechanism to provide the motive force necessary to selectively position the valve sealing mechanism.

Because the piston/cylinder arrangement is offset from the main valve body, a center of gravity of the valve assembly is typically displaced a distance from a centerline axis of the valve body. Such an eccentric center of gravity may induce bending stresses into the valve assembly, adjoining tubing, and supporting brackets during engine operation. Depending on the application, the physical size and weight of the piston/cylinder arrangement may also present difficulties during the duct routing phase of the engine design.

BRIEF SUMMARY OF THE INVENTION

In one aspect, a method for operating a gas turbine engine is provided. The method comprises directing fluid flow from a source into an inlet of a valve, channeling the fluid flow entering an inlet portion of the valve towards an outlet portion of the valve such that a direction of the fluid flow is changed within the inlet portion, and controlling the amount of fluid flow entering the outlet portion of the valve by selectively positioning a valve disk coupled within the inlet portion of the valve by a valve disk axle. The method also comprises channeling the fluid flow from the inlet portion of the valve through the outlet portion of the valve and into a fluid supply pipe, wherein the valve outlet portion has a substantially right cylindrical shape such that a direction of fluid entering the body outlet portion remains substantially constant therethrough.

In another aspect of the invention, a valve for use with a gas turbine engine is provided. The valve comprises a valve body including a valve inlet portion and an outlet portion. The inlet portion extends from an inlet to the body outlet portion. The body outlet portion forms a substantially right cylinder that extends from the inlet portion to a valve outlet, such that a direction of fluid flowing within the body outlet portion remains substantially unchanged between the body inlet portion and the valve outlet. The inlet portion includes a valve disk and at least one bend formed between the body outlet portion and the valve inlet such that a direction of fluid entering the valve body through the valve inlet is changed prior to entering the body outlet portion. The valve disk is pivotally coupled within the inlet portion for controlling fluid flow through the valve.

In a further aspect, a gas turbine engine is provided. The engine includes a fluid supply pipe a valve configured to regulate an amount of fluid flow entering the fluid supply pipe. The valve includes a valve body comprising an inlet, an outlet, an inlet portion, and an outlet portion. The inlet portion extends between the inlet and the outlet. The outlet portion extends between the inlet portion and the outlet. The outlet portion has a substantially right cylindrical shape such that a direction of fluid entering the body outlet portion remains substantially constant therethrough. The inlet portion includes a valve disk and at least one bend formed between the inlet and the body outlet portion, such that a direction of fluid flowing through the body inlet portion is changed prior to entering the outlet portion. The valve disk is used to control fluid flow through the valve into the fluid supply pipe.

DETAILED DESCRIPTION OF THE INVENTION

Figure 1:
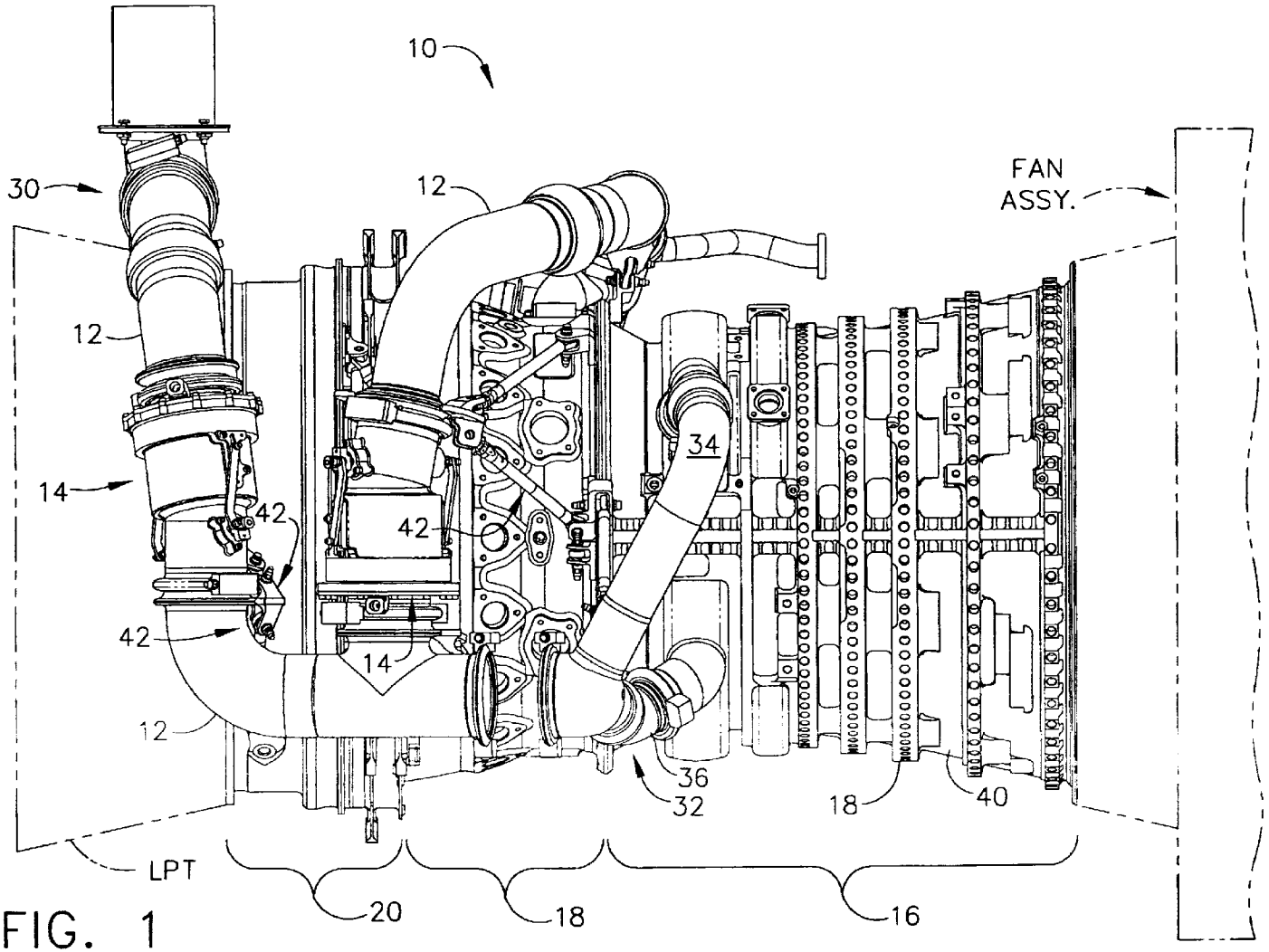
FIG. 1 is a side view of a gas turbine engine including a plurality of ducting coupled together by a plurality of valve assemblies.

FIG. 1 is a side view of a gas turbine engine 10 including a plurality of ducting 12 coupled together by a plurality of valve assemblies 14. Engine 10 includes a high-pressure compressor assembly 16, a combustor 18, and a turbine assembly 20. In one embodiment, compressor 16 is a high-pressure compressor. Engine 10 also includes a low-pressure turbine (not shown) and a fan assembly (not shown). In one embodiment, engine 10 is a CF34 engine commercially available from General Electric Company, Cincinnati, Ohio.

In the exemplary embodiment, ducting 12 and valve assemblies 14 form a portion of an engine build up (EBU) 30. More specifically, ducting 12 and valve assemblies 14 facilitate channeling and controlling, respectively, fluid flow at a high temperature, and/or at a high pressure, from one area of engine 10 for use in another area. For example, in one embodiment, fluid flowing through ducting 12 and valve assemblies 14 has an operating temperature that is greater than 1000° F. and/or an operating pressure of greater than 300 psi.

In the exemplary embodiment, ducting 12 includes a Y-duct 32 that facilitates splitting EBU 30 into a pair of inlet duct assemblies 34 and 36 that are coupled to an engine casing 40 by a plurality of mounting bracket assemblies 42. More specifically, inlet duct assemblies 34 and 36 are coupled in flow communication to compressor 18 for routing bleed air from compressor 18 for use in other areas, such as an environmental control system.

Figure 2:
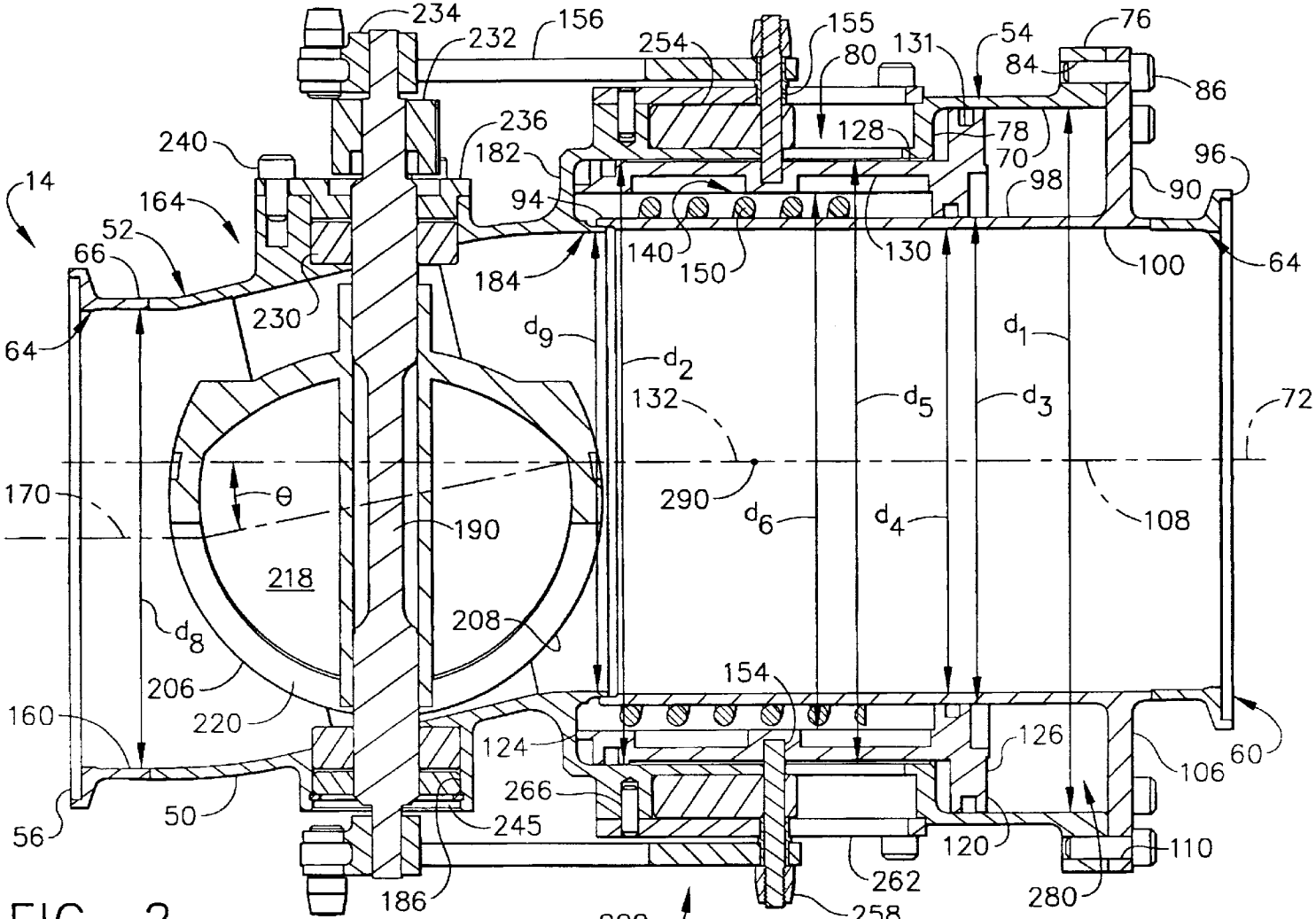
FIG. 2 is a cross-sectional view of one of the valve assemblies shown in FIG. 1.
Figure 3:
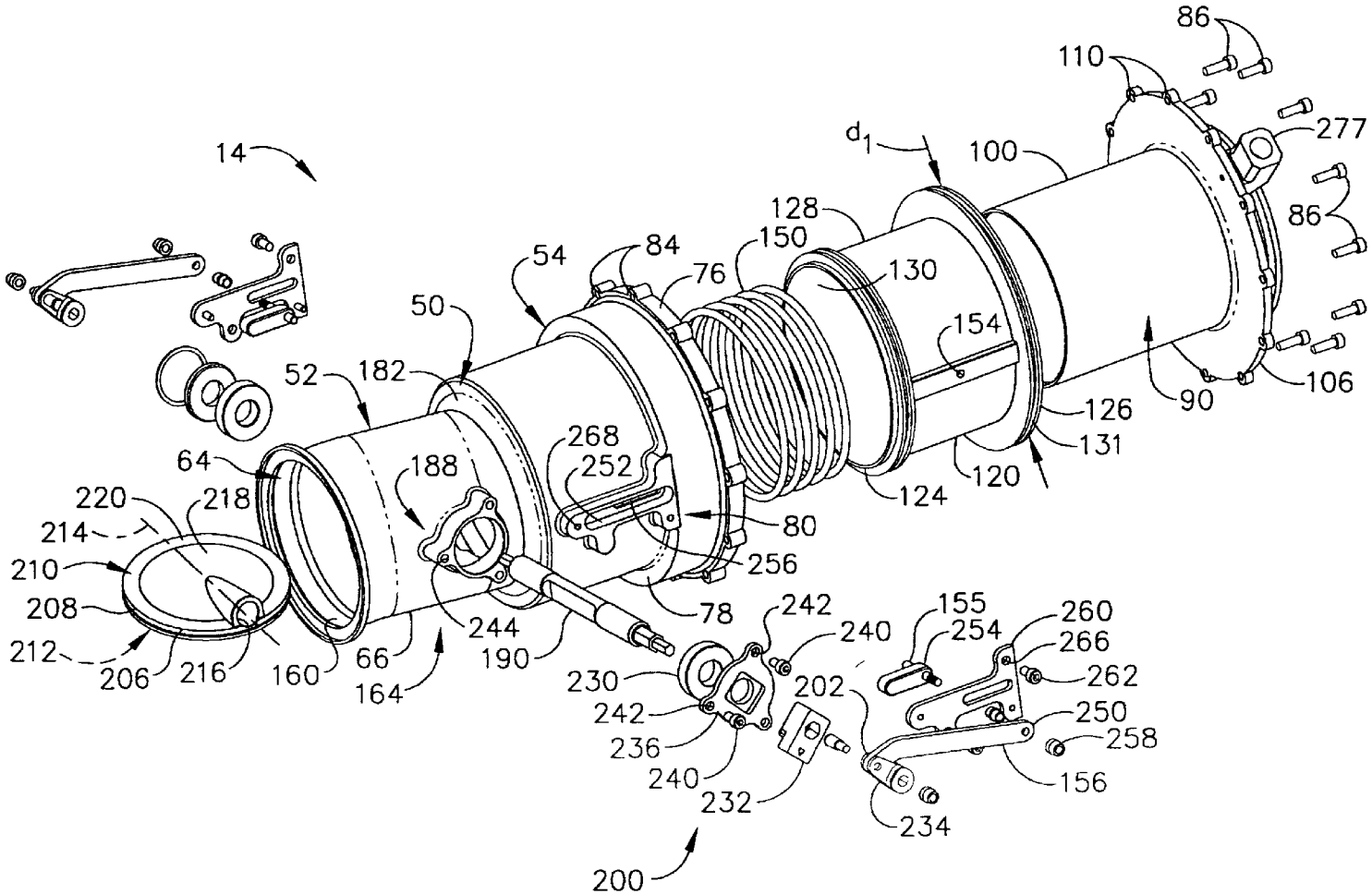
FIG. 3 is an exploded perspective view of the valve assembly shown in FIG. 2.

FIG. 2 is a cross-sectional view a valve assembly 14. FIG. 3 is an exploded perspective view of valve assembly 14. Valve assembly 14 includes a valve body 50 having a first body portion 52 and an integrally-formed second body portion 54. In the exemplary embodiment, first body portion 52 is an inlet body portion, and second body portion 54 is an outlet body portion, and both will be described herein as such. In an alternative embodiment, first body portion 52 is an outlet body portion, and second body portion 54 is an inlet body portion. Inlet portion 52 extends from an assembly first end 56 to outlet portion 54, and outlet portion 54 extends from inlet portion 52 to an assembly second end 60. In the exemplary embodiment, assembly first end 56 is an assembly inlet, and assembly second end 60 is an outlet, and both will be described herein as such. In an alternative embodiment, assembly first end 56 is an assembly outlet for discharging fluids therefrom, and assembly second end 60 is an assembly inlet for receiving fluids therein. Valve assembly 14 is hollow and includes a bore 64 that extends between assembly inlet 56 and assembly outlet 60. Valve assembly 14 also includes an exterior surface 66 that extends over inlet and outlet portions 52 and 54, respectively.

Valve assembly outlet portion 54 includes an interior surface 70 and a centerline 72. Interior surface 70 extends through outlet portion 54 to outlet 60 and defines a portion of assembly bore 64. Because outlet portion 54 is a right cylinder, assembly outlet 60 is substantially perpendicular to outlet portion centerline 72.

Outlet portion 54 also includes an integrally-formed mounting flange 76, an inner shoulder 78, and a pair of actuator system connector link mounts 80. Flange 76 extends circumferentially from outlet portion exterior surface 66 around assembly outlet 60, and includes a plurality of openings 84. Openings 84 are each sized to receive a fastener 86 therethrough for coupling outlet portion 54 to a valve-inner cylinder 90.

Outlet portion shoulder 78 is positioned between flange 76 and actuator system mounts 80. More specifically, a diameter $d_1$ of bore 64 within outlet portion 54, defined by surface 70, is substantially constant between assembly outlet 60 and shoulder 78, and is larger than a diameter $d_2$ of outlet portion bore 64 extending between shoulder 78 and inlet portion 52.

Valve-inner cylinder 90 is a substantially right hollow cylinder that that extends from an inlet edge 94 to an outlet edge 96, and includes an exterior surface 98 and an interior surface 100. Exterior and interior surfaces 98 and 100, respectively, define respective external and internal diameters $d_3$ and $d_4$ for cylinder 90. Diameters $d_3$ and $d_4$ are substantially constant along cylinder 90 between edges 94 and 96, and both diameters $d_3$ and $d_4$ are smaller than outlet portion bore diameter $d_2$. Accordingly, valve-inner cylinder 90 is sized to be received within outlet portion 54, such that cylinder 90 is substantially concentrically aligned with respect to outlet portion 54.

A mounting flange 106 extends radially outwardly and circumferentially from cylinder outlet edge 96. Flange 106 is aligned substantially perpendicular to a centerline axis 108 extending through cylinder 90, and includes a plurality of fastener openings 110 that are each sized to receive fastener 86 therethrough. More specifically, when valve-inner cylinder 90 is positioned within outlet portion 54, cylinder fastener openings 110 are each substantially concentrically aligned with respect to each respective outlet portion flange fastener opening 84, such that fasteners 86 extending through openings 110 and 84 secure valve-inner cylinder 90 in alignment within outlet portion 54.

A valve piston 120 is slidably coupled between valve-inner cylinder 90 and outlet portion 54. More specifically, valve piston 120 is a substantially right hollow cylinder that that extends from an inlet edge 124 to an outlet edge 126, and includes an exterior surface 128 and an interior surface 130. Exterior and interior surfaces 126 and 130, respectively, define respective external and internal diameters $d_5$ and $d_6$ for piston 120. In the exemplary embodiment, diameters $d_5$ and $d_6$ are substantially constant between piston edges 124 and 126, and both diameters $d_5$ and $d_6$ are larger than valve-inner cylinder external diameter $d_3$. In an alternative embodiment, an inlet side of piston 120 has a smaller diameter than an outlet side of piston 120, which as described in more detail below, facilitates piston 120 being double acting. Additionally, piston external diameter $d_5$ is slightly smaller than outlet portion bore diameter $d_2$, such that when piston 120 is received within outlet portion 54, piston external surface 128 is slidably coupled against outlet portion interior surface 70 between outlet portion shoulder 78 and inlet portion 52.

A seal assembly 131 extends circumferentially around piston outlet edge 126 to facilitate minimizing leakage of actuation air past piston outlet edge 126. Seal assembly 131 is substantially perpendicular to a centerline axis 132 extending through cylinder 120, and has an outer diameter $d_7$ that is slightly smaller than outlet portion bore diameter $d_1$.

Piston internal diameter $d_6$ is larger than valve-inner cylinder external diameters $d_3$ such that a gap 140 is defined between piston interior surface 130 and valve-inner cylinder external surface 98. More specifically, gap 140 extends between seal assembly 131 and piston inlet edge 124. A valve spring 150 extends circumferentially within gap 140 between valve-inner cylinder 90 and valve piston 120, and as described in more detail below, is used to regulate operation of valve assembly 14.

Valve piston 120 also includes a pair of openings 154 that are extends diametrically aligned with respect to valve piston 120 and extend partially between exterior surface 128 and interior surface 130. Openings 154 are each sized to receive a connecting rod 155 that enables valve piston 120 to be coupled to an actuator system connector link 156.

Valve inlet portion 52 includes an interior surface 160 that extends through inlet portion 52 to assembly inlet 56 and defines a portion of assembly bore 64. In the exemplary embodiment, a diameter $d_8$ of inlet portion 52 remains substantially constant through inlet portion 52 between outlet portion 54 and assembly inlet 56, and through an integrally formed bend 164 that is positioned between valve outlet portion 54 and assembly inlet 56. In the exemplary embodiment, inlet portion 52 has a generally Z-shaped bend 164 such that assembly inlet 56 is substantially parallel to assembly outlet 60. In an alternative embodiment, interior surface 160 is oriented substantially parallel to formed bend 164 to facilitate a smooth transition between adjoining ducting 12. In a further alternative embodiment, valve assembly 14 includes piston 120, but valve inlet portion 52 does not include bend 164. Rather, in this alternative embodiment, valve inlet portion 52 is a substantially right cylinder.

Valve inlet portion 52 includes a centerline 170 that extends between assembly inlet 56 and outlet portion 54. More specifically, in the exemplary embodiment, between inlet 56 and bend 164, centerline 170 is substantially parallel to outlet portion centerline 72, and between bend 164 and outlet portion 54, centerline 170 is substantially co-linear with outlet portion centerline 72. Accordingly, within bend 164, centerline 170 extends obliquely with respect to outlet portion centerline 72. More specifically, within bend 164, centerline 170 is obliquely offset an angle θ from outlet portion centerline 72. In one embodiment, angle θ is equal between approximately six and twenty degrees. In the exemplary embodiment, angle θ is approximately equal thirteen degrees.

Inlet portion diameter $d_8$ is smaller than bore diameter $d_2$ extending between outlet portion shoulder 78 and inlet portion 52. Accordingly, a shoulder 182 is defined at the union of inlet and outlet portions 52 and 54, respectively. Shoulder 182 provides a biasing contact for valve spring 150, and includes an annular seal 184 has a diameter $d_9$ that is slightly smaller than valve inner cylinder external diameter $d_3$, and as such facilitates positioning valve-inner cylinder 90 with respect to valve body 50.

Inlet portion 52 includes an opening 186 that extends diametrically through inlet portion 52 between inlet portion exterior surface 66 and interior surface 160. In the exemplary embodiment, opening 186 is substantially parallel valve piston opening 154 and is sized to receive an actuator system axle 190 therethrough. More specifically, and as described in more detail below, each opening 186 extends through an actuator system inlet mount 188 that is integrally formed with inlet portion 52.

An actuator system 200 is coupled to valve body 50 to facilitate controlling fluid flow through valve assembly 14. Specifically, actuator system 200 is coupled to valve inlet and outlet portions 52 and 54, respectively, by connector link 156. More specifically, an inlet side 202 of connector link 156 is coupled to axle 190 for controlling rotation of a sealing mechanism or sealing plate 206.

Sealing plate 206 has a substantially circular outer perimeter 208 and a substantially arcuate cross-sectional profile. In the exemplary embodiment, sealing plate 206 is formed with a constant radius such that plate 206 has a truncated spherical cross-sectional profile. Sealing plate 206 includes a front side 210 and an opposing rear side 212. Plate 206 includes a centerline axis 214 extending therethrough, and a shaft bore 216 that extends therethrough and is sized to receive axle 190 therein. More specifically, axle 190 extends through shaft bore 216 and pivotally couples plate 206 within valve body 50.

Each plate side 210 and 212 defines a portion of shaft bore 216. More specifically, bore 216 is not concentrically aligned with respect to plate centerline axis 214, but rather extends obliquely through plate 206 with respect to centerline axis 214. Accordingly, each side 210 and 212 includes a raised area 218 that extends outwardly from an outer surface 220 of plate 206 in a frusto-conical cross-section to define a portion of shaft bore 216.

Plate raised areas 218 enable axle 190 to extend through plate 206 within inlet portion bend 164. More specifically, axle 190 is aligned substantially perpendicularly with respect to outlet portion centerline 72, and is therefore aligned obliquely at angle θ with respect to bend centerline 170. Accordingly, when plate 206 is in a fully open position, as shown in FIGS. 2 and 3, plate 206 is obliquely offset with respect to inlet portion bend 164. However, because axle 190 is offset from plate centerline axis 214, when plate 206 is rotated to a fully closed position, plate 206 is aligned substantially perpendicularly with respect to bend centerline 170 such that plate outer perimeter 208 circumferentially contacts inlet portion interior surface 160 in sealing contact, as described in more detail below. In one embodiment, valve assembly 14 includes a sensor to sense a position of plate 206 with respect to valve assembly, such as but not limited to an LVDT displacement transducer. Valve axle 190 is inclined at angle θ with respect to bend centerline 170 and with respect to plate centerline axis 214 to facilitate providing a continuous and substantially round sealing contact between plate outer perimeter 208 and interior surface 160. More specifically, bend 164 enables plate 206 to be aligned substantially perpendicularly to interior surface 160 when plate 206 is fully closed, and causes axle 190 to be aligned substantially perpendicularly to the motion of piston 120.

Axle 190 is rotatably coupled to connector link inlet side 202 at each actuator system inlet mount 188 by a pair of bearings 230, a valve lock 232, and a pair of cranks 234. More specifically, bearings 230 are rotatably coupled to axle 190 within each mount 188, and are secured in position by seal members 236. A seal member 236 nearest valve lock 232 are coupled to inlet portion 52 by a plurality of fasteners 240 that extend through seal member openings 242 and into integrally formed inlet mount openings 244 and into integrally formed inlet mount openings 244. A seal member 236 opposite valve lock 232 are coupled to inlet portion 52 by an arcuate snap ring 245. Seal members 236 facilitate preventing fluid leakage through inlet portion opening 186 and around axle 190.

Axle 190 is then inserted through each valve lock 232 prior to being coupled to connector link inlet side 202 by each respective crank 234. Valve lock 232 facilitates maintaining axle 190 in rotational position, such that plate 206 may be maintained in an orientation, such as fully open or fully closed, with respect to valve body 50.

An outlet side 25 of each connector link 156 is coupled to valve piston 120 by connecting rod 155 through connector link mounts 80. More specifically, each connector link mount 80 includes an integrally formed slot 252 that extends substantially parallel to outlet portion centerline 72. Each slot 252 is sized to receive a slider 254 therein in slidable contact, and includes a slotted opening 256 that extends through slot 252. Each connecting rod 155 is couple to valve piston 120 and extends radially outward through slotted openings 256 and through sliders 254 to couple through a threaded nut 258 to connector link outlet side 250. More specifically, a cover plate 260 is aligned with respect to slot 252 by a plurality of dowel pins 262 that extend through cover plate openings 266.

During operation, fluid enters valve assembly 14 through assembly inlet 56 and into valve body inlet portion 52. Inlet portion bend 164 causes a direction fluid flowing within inlet portion 52 to be changed within inlet portion 52. More specifically, fluid flow is turned through angle θ in the vicinity of plate 206. Bend 164 enables axle 190 to be coupled substantially perpendicularly to movement of piston 120 which, as described in more detail below, facilitates converting rectilinear motion of piston 120 into rotary motion of sealing plate 206. Accordingly, if plate 206 is in a fully closed position, plate 206 is substantially perpendicular to a direction of fluid flow within bend 164. As such, plate outer perimeter 208 forms a substantially continuous seal circumferentially within inlet portion 52, which facilitates preventing fluid flow through valve assembly 14. More specifically, when plate 206 is rotated to the closed position, actuator or supply fluid is turned off and spring 150 biases sealing plate 206 through actuator system 200 in the fully closed position.

Main actuation fluid enters valve piston 120 through a port 277 and operates against valve piston outlet face 126.

Additional actuation fluid operates on valve piston 120 in a gap 279 that is partially defined between valve piston inlet edge 124 and shoulder 182. Accordingly, piston 120 is double actuated by the actuation fluid. More specifically, when plate 206 is desired to be rotated into a partially opened or modulated position, main pressurized actuator fluid is supplied to outlet portion 54 through port 277 into a gap 280 defined between valve piston seal assembly 131 and valve-inner cylinder mounting flange 106. The fluid pressure of the actuator fluid forces piston 120 to translate, which in turn causes connectors links 156 to translate through slots 252. The translational motion of links 156 causes subsequent rotational motion of valve cranks 234. Rotation of cranks 234 causes rotation of axle 190 which causes plate 206 to rotate from the closed position, such that fluid flows past sealing mechanism 206 and downstream from valve assembly 14.

Annular seat 184 allows for axial thermal growth differences between valve-inner cylinder 90 and valve body 50. Seat 184 also permits flid that has flowed downstream from seat 206 to enter gap 140. Fluid pressure within gap 140 acts in opposition to the force induced by actuation fluid, which in conjunction with spring force induced by spring 150 causes plate 206 to self-regulate the flow of fluid. More specifically, if the downstream pressure decreases, the opposing force also decreases, which allows pressurized actuation fluid to force sealing mechanism 206 to open more fully to restore the regulated fluid flow at a predetermined pressure.

Despite the offset of inlet portion 52 with respect to outlet portion 54, a center of gravity 290 of valve assembly 14 is located substantially along outlet portion centerline 72. Accordingly, ending stresses induced to valve assembly 14 during the operation of actuator system 200 are facilitated to be reduced in comparison to other known valves which have offset centers of gravity. As such, valve body 50 facilitates extending a useful life of valve assembly 14. Furthermore, because center of gravity 290 is positioned along outlet portion centerline 72 eccentricity induced bending stresses of adjoining ducting 12 are also facilitated to be reduced, which facilitates the use of mounting bracket assemblies 42 fabricated from lighter weight materials. In addition, valve assembly 14 requires less physical space envelopes than other known valve assemblies used for the same applications.

Figure 4:
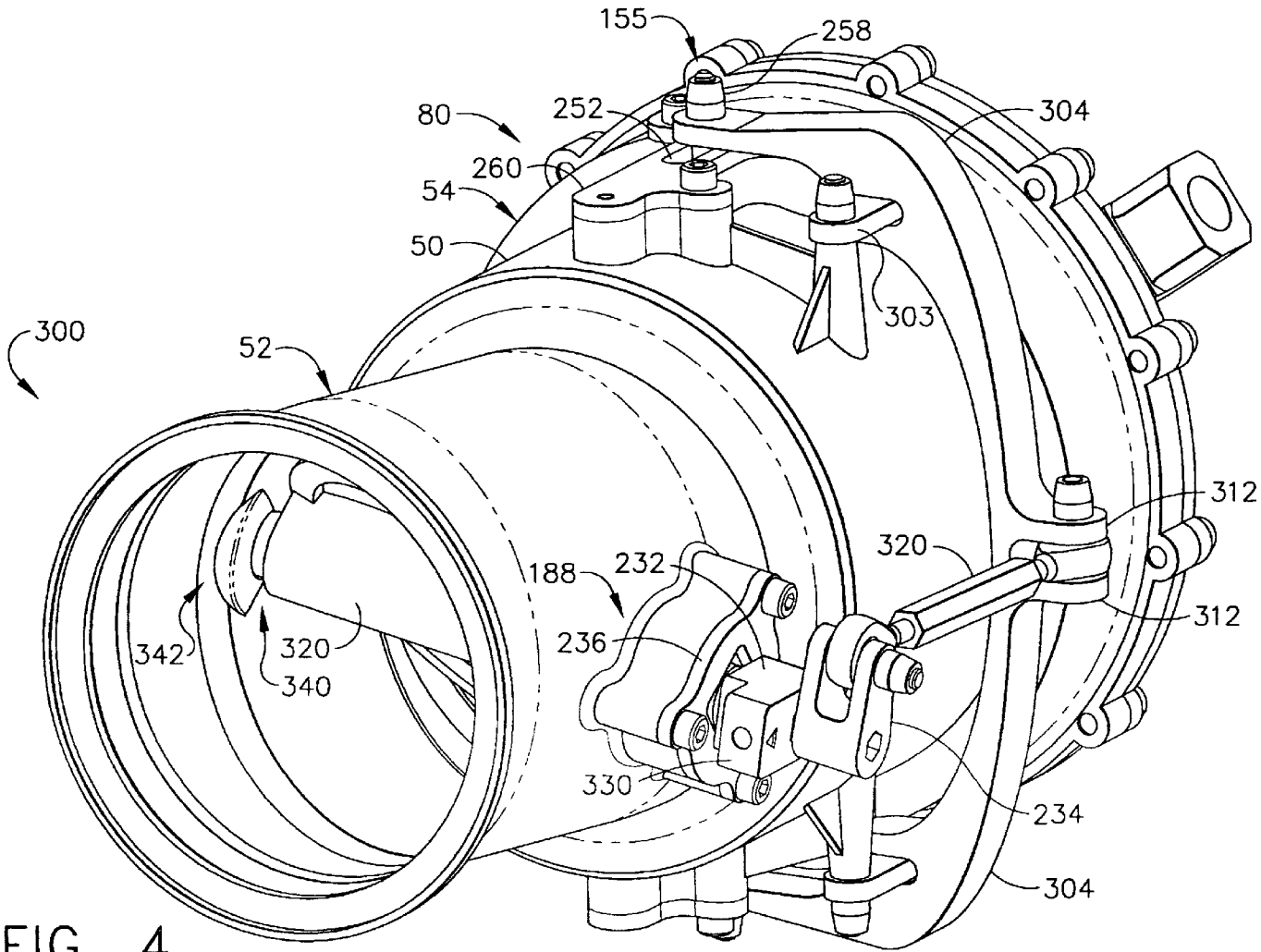
FIG. 4 is a perspective view of an alternative embodiment of a valve assembly that may be used with the gas turbine engine shown in FIG. 1.
Figure 5:
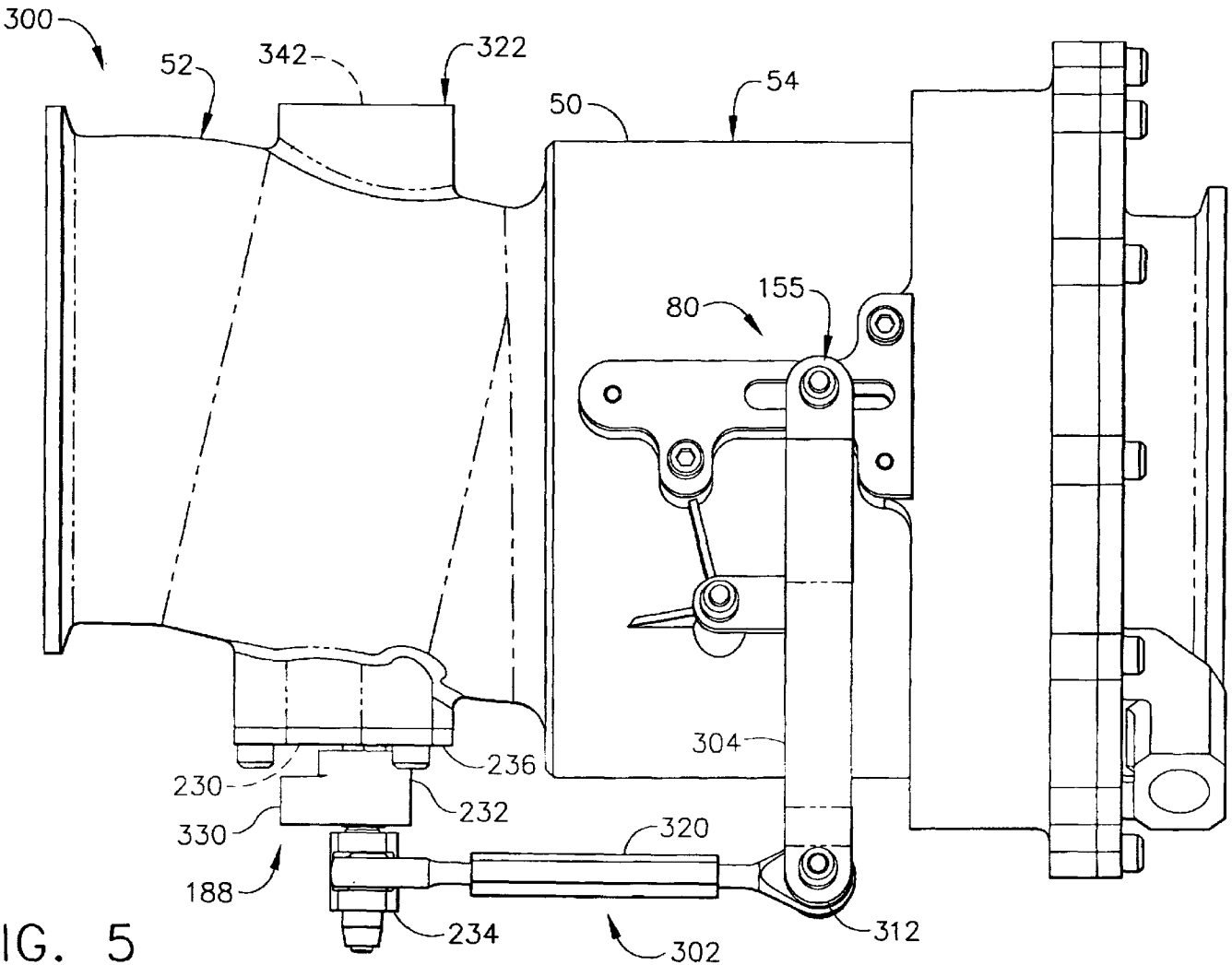
FIG. 5 is a side view of the valve assembly shown in FIG. 4.

FIG. 4 is a perspective view of an alternative embodiment of a valve assembly 300 that may be used with gas turbine engine 10 (shown in FIG. 1). FIG. 5 is a side view of valve assembly 300. Valve assembly 300 is substantially similar to valve assembly 14 (shown in FIGS. 2 and 3) and components of assembly 14 that are identical to components of valve assembly 300 are identified in FIGS. 4 and 5 using the same reference numerals used in FIGS. 2 and 3. Accordingly, valve assembly 300 includes valve body 50, inlet portion 52, and outlet portion 54. Additionally valve assembly 300 includes valve-inner cylinder 90, valve piston 120, and an actuator system 302. Actuator system 302 is substantially similar to actuator system 200 and includes a pair of pivot links 303 coupled to sealing plate 206 by a wishbone link 304.

More specifically, each wishbone link 304 includes a pair of outlet ends and a connector actuator coupler 12. Each wishbone link outlet end is coupled to outlet portion 54 by connecting rods 155 extending through mounts 80. More specifically, each wishbone link mount 80 include slot 252 and slider 254. Each connecting rod 155 is coupled to valve piston 120 and extends radially outward through slotted openings 256 and through sliders 254 to couple through bushing 258 to pivot link outlet side 250. More specifically, cover plate 260 is coupled to each pivot link mount 80 by fasteners 262 that extend through cover plate openings 266 into openings 268 formed integrally within each link mount 80.

Each pivot links 303 is pivotally coupled to wishbone link 304 between wishbone link outlet end 156 and wishbone connector actuator coupler 312. Pivot links 303 provide additional support to wishbone link 304 and facilitate maintaining wishbone link 304 in alignment with respect to valve assembly 300.

Wishbone link 304 extends partially circumferentially to couple together with an actuator rod 320 that extends laterally upstream towards an inlet actuator mount 188. Within valve assembly 300, inlet portion 52 includes only one actuator mount 188, but also includes an integrally-formed axle seat 322 that is described in more detail below. Each wishbone link 304 is also pivotally coupled by a hinge pin 324 that is positioned between wishbone link outlet end 156 and wishbone connector actuator coupler 312.

Actuator rod 320 is coupled to actuator mount 188 with an axle 190 that is rotatably coupled to actuator rod 320 by a bearing 230, a valve lock 232, a crank 234, and a yoke 330. More specifically, bearing 230 is rotatably coupled to axle 190 within mount 188, and is secured in position by seal member 236. Axle 190 is also inserted through valve lock 232 prior to being inserted through yoke 330 and coupled to actuator rod 320 by crank 234. Yoke 330 provides addition support to actuator system 302.

Axle 190 does not extend diametrically through inlet portion 52, but rather, an inner end 340 of axle 190 is rotatably coupled within a bearing assembly 342. More specifically, bearing assembly 342 is seated within axle seat 322. Accordingly, because valve assembly 300 includes only one opening 186 within inlet portion 52, valve assembly 300 facilitates reducing blow-by leakage that may occur through openings 186.

The above-described valve assembly is cost-effective and highly reliable. The valve assembly includes a valve body that includes an integrally formed inlet and outlet portion. Because the portions are only offset by a minimal angle, the center of gravity of the assembly is located within the valve assembly and along a centerline of the outlet portion. As such, vibrational induced bending moments and eccentricity induced stresses to the valve body are facilitated to be reduced. As a result, the valve body facilitates extending a useful life of the valve assembly in a cost-effective and reliable manner.

While the invention has been described in terms of various specific embodiments, those skilled in the art will recognize that the invention can be practiced with modification within the spirit and scope of the claims.

What is claimed is:

1. A valve for use with a gas turbine engine, said valve comprising a valve body comprising an inlet portion and an outlet portion, said inlet portion extending from a valve inlet to said body outlet portion, said body outlet portion forming a substantially right cylinder extending from said inlet portion to a valve outlet such that a direction of fluid flowing within aid body outlet portion remains substantially unchanged between said body inlet portion an said outlet, said inlet portion comprising a valve disk and at least one bend formed between said body outlet portion and said valve inlet such that a direction of fluid entering said valve body through said valve inlet is changed prior to entering said body outlet portion, said valve disk pivotally coupled within said inlet portion for controlling fluid flow through said valve, said body outlet portion comprises a centerline axis of symmetry, and a piston assembly housed therein, at least a portion of said piston assembly is translatable in a direction that is substantially parallel to a direction of fluid flowing through said body outlet portion.

2. A valve in accordance with claim 1 wherein said inlet portion valve disk is rotatably coupled by a valve disk axle such that said valve disk is rotatable between an open position and a closed position.

3. A valve in accordance with claim 2 wherein said inlet portion valve disk is within said inlet portion at least one bend.

4. A valve in accordance with claim 2 wherein said valve disk axle comprises a first end and a second end, only one of said first end and said second end extends through a sidewall defining said valve body inlet portion.

5. A valve in accordance with claim 2 wherein said inlet portion valve disk axle is substantially perpendicular said body outlet centerline axis of symmetry.

6. A valve in accordance with claim 2 wherein said piston assembly further comprises a biasing mechanism for biasing said valve disk in the closed position.

7. A valve in accordance with claim 2 wherein said piston assembly further comprises a locking mechanism for securing said valve disk in at least one of said open position and said closed position.

8. A gas turbine engine valve comprising a valve body comprising an inlet portion and *an* outlet portion, said inlet portion extending from a valve inlet to said body outlet portion, a*t* least one of said body outlet portion and said body inlet portion forming a substantially right cylinder, such that a direction of fluid flowing therethrough remains substantially *un*changed, at least one of said inlet portion and said outlet portion comprising a valve disk pivotally coupled therein for controlling fluid flow through said valve, said remaining other portion comprising a piston assembly housed therein, at least a portion of said piston assembly is translatable in a direction that is substantially parallel to a direction of fluid flowing through said valve, said piston assembly comprises a locking mechanism for securing said valve disk in at least one of [said] *an* open position and [said] *a* closed position, said locking mechanism is rotatably coupled to said valve body.

9. A gas turbine engine valve in accordance with claim 8 wherein said valve disk is rotatably coupled by a valve disk axle such that said valve disk is rotatable between an open position and a closed position.

10. A gas engine turbine valve in accordance with claim 9 wherein said valve disk axle comprises a first end and a second end, only one of said first end and said second end extends through a sidewall extending circumferentially around said valve disk.

11. A gas engine turbine valve in accordance with claim 8 wherein said piston assembly further comprises a biasing mechanism for biasing said valve disk in the closed position.

*12. A valve for use with a gas turbine engine, said valve comprising an inlet, an outlet, an inlet portion, an outlet portion, and a valve disk coupled between said valve outlet and said valve inlet for controlling fluid flow through said valve, said inlet portion comprising at least one bend formed between said outlet portion and said inlet such that a direction of fluid entering said valve through said inlet is changed prior to entering said outlet portion, said inlet portion and said outlet portion each comprise a centerline axis extending therethrough, one of said inlet portion and said outlet portion comprises a piston assembly housed therein, said piston assembly is translatable along one of said inlet portion centerline axis and said outlet portion centerline axis.*

*13. A valve in accordance with claim 12 wherein a center of gravity of said piston assembly is located along one of said inlet portion centerline axis and said outlet portion centerline axis.*

*14. A valve in accordance with claim 13 wherein said piston assembly center of gravity remains substantially along said centerline axis during operation of said piston assembly.*

*15. A valve in accordance with claim 12 wherein said piston assembly is translatable in a direction that is substantially parallel to a direction of fluid flowing through said outlet portion.*

*16. A valve in accordance with claim 12 wherein said piston assembly facilitates reducing bending stresses induced to said valve body.*

*17. A valve in accordance with claim 12 wherein said piston assembly comprises an actuator system coupled to said valve disk for controlling fluid flow through said valve, said valve disk is pivotally coupled within one of said inlet portion and said outlet portion.*

*18. A valve in accordance with claim 17 further comprising a valve disk axle extending from said valve disk through a sidewall defining one of said inlet portion and said outlet portion to said actuator system, said axle is substantially perpendicular to said outlet portion centerline.*

*19. A valve in accordance with claim 12 wherein said outlet portion forms a substantially right cylinder extending from said inlet portion to said valve outlet, said outlet portion sized to receive an inner cylinder therein such that said inner cylinder is substantially concentrically aligned with respect to said outlet portion.*

*20. A valve in accordance with claim 19 wherein said piston assembly further comprises a biasing mechanism for biasing said valve disk in an open position.*

*21. A valve in accordance with claim 19 wherein said piston assembly further comprises a biasing mechanism for biasing said valve disk in a closed position.*

*22. A valve in accordance with claim 19 wherein said piston assembly further comprises a biasing mechanism for biasing said valve disk in one of an open position and a closed position, said biasing mechanism extends substantially circumferentially between said valve inner cylinder and said piston assembly.*

*23. A valve in accordance with claim 12 wherein said piston assembly further comprises a locking mechanism for securing said valve disk in at least one of an open position and a closed position.*

*24. A valve for use with a turbine engine, said valve comprising an inlet, an outlet, and a valve body comprising an inlet portion and an outlet portion, said inlet portion extending from said valve inlet to said body outlet portion and comprising a centerline axis extending therethrough, said body outlet portion extending from said body inlet portion to said valve outlet and comprising a centerline axis extending therethrough, one of said inlet portion and said outlet portion comprises a valve disk pivotally coupled therein for controlling fluid flow through said valve, said inlet portion comprising at least one bend formed between said outlet portion and said inlet such that a direction of fluid entering said valve through said inlet is changed prior to entering said outlet portion, one of said body inlet portion and said body outlet portion comprises a piston assembly housed therein and oriented such that a center of gravity of said piston assembly is located along one of said inlet portion centerline axis and said outlet portion centerline axis.*

*25. A valve in accordance with claim 24 wherein said piston assembly is translatable in a direction that is substantially parallel to a direction of fluid flowing through said body outlet portion.*

*26. A valve in accordance with claim 25 wherein said piston assembly center of gravity remains substantially along one of said inlet portion centerline axis and said outlet portion centerline axis during translation of said piston assembly.*

*27. A valve in accordance with claim 24 wherein said piston assembly comprises an actuator system coupled to said valve disk via an axle, said actuator system for controlling rotation of said valve disk from an open position to a closed position.*

*28. A valve in accordance with claim 27 wherein said axle remains substantially perpendicular to said outlet portion centerline axis during rotation of said valve disk.*

*29. A valve in accordance with claim 24 wherein one of said outlet portion and said inlet portion forms a substantially right cylinder that is sized to receive an inner cylinder therein such that said inner cylinder is substantially concentrically aligned within said right cylinder.*

*30. A valve in accordance with claim 29 wherein said piston assembly further comprises a biasing mechanism for biasing said valve disk in a open position, said biasing mechanism extends substantially circumferentially between said valve inner cylinder and said piston assembly.*

*31. A valve in accordance with claim 29 wherein said piston assembly further comprises a biasing mechanism for biasing said valve disk in a closed position, said biasing mechanism extends substantially circumferentially between said valve inner cylinder and said piston assembly.*

* * * * *